(12) United States Patent
Osborn et al.

(10) Patent No.: US 7,549,533 B2
(45) Date of Patent: Jun. 23, 2009

(54) INJECTION MOLDED CASE FOR OPTICAL STORAGE DISCS

(75) Inventors: Warren R. Osborn, Provo, UT (US); Bryan P. Dunford, Provo, UT (US)

(73) Assignee: Encore Holdings Limited, Nassau (BS)

( * ) Notice: Subject to any disclaimer, the term of this patent is extended or adjusted under 35 U.S.C. 154(b) by 134 days.

(21) Appl. No.: 11/463,211

(22) Filed: Aug. 8, 2006

(65) Prior Publication Data

US 2007/0163902 A1 Jul. 19, 2007

Related U.S. Application Data

(63) Continuation-in-part of application No. 11/268,205, filed on Nov. 7, 2005, now Pat. No. 7,428,968.

(60) Provisional application No. 60/760,873, filed on Jan. 20, 2006, provisional application No. 60/795,504, filed on Apr. 27, 2006, provisional application No. 60/797,107, filed on May 2, 2006.

(51) Int. Cl.
B65D 85/57 (2006.01)

(52) U.S. Cl. .................................... 206/308.1; 206/232

(58) Field of Classification Search ......... 206/307–312; 53/467, 468, 473; D6/632
See application file for complete search history.

(56) References Cited

U.S. PATENT DOCUMENTS

| | | | | |
|---|---|---|---|---|
| 5,531,322 A | * | 7/1996 | Iwaki et al. | 206/308.3 |
| D459,935 S | | 7/2002 | Takahashi et al. | |
| D497,074 S | * | 10/2004 | Dardashti | D6/632 |
| D497,508 S | * | 10/2004 | Dardashti | D6/632 |
| 2003/0019772 A1 | * | 1/2003 | Chan | 206/310 |
| 2003/0029761 A1 | * | 2/2003 | Onmori et al. | 206/387.13 |
| 2003/0075463 A1 | | 4/2003 | Perez et al. | |
| 2003/0111367 A1 | | 6/2003 | Lax et al. | |
| 2003/0146119 A1 | * | 8/2003 | Lee | 206/310 |
| 2003/0196916 A1 | * | 10/2003 | Jakobowicz | 206/308.1 |
| 2005/0150792 A1 | * | 7/2005 | Bolognia et al. | 206/308.1 |
| 2005/0224377 A1 | * | 10/2005 | Lammerant | 206/308.1 |
| 2005/0230274 A1 | | 10/2005 | Preece et al. | |

FOREIGN PATENT DOCUMENTS

| | | |
|---|---|---|
| EP | 1083569 A1 | 9/1999 |
| WO | WO 02/39451 A2 | 5/2002 |
| WO | WO-2004/001759 A1 | 12/2003 |
| WO | WO-2004/063022 A2 | 7/2004 |

* cited by examiner

*Primary Examiner*—Luan K Bui
(74) *Attorney, Agent, or Firm*—Kauth, Pomeroy, Peck & Bailey LLP

(57) ABSTRACT

An injection molded one-piece optical disc case with a front cover and a back cover attached to a spine via live hinges. The case, when closed, has generally semi-cylindrical rimwalls, including upper and lower rimwalls, a spine rimwall, and a closure rimwall. The rimwalls intersect in generally quarter-spherical corners. The generally semi-cylindrical rimwalls may be optionally flattened slightly to prevent multiple closed cases that are being pushed down an assembly line from climbing over one another. Another novel feature of the optical disc case is an off-center disk mounting hub on each cover to leave room for a title band at the top of the case and also to leave room for the attachment of an EAS tag inside the case. The case also optionally incorporates antitheft elements.

15 Claims, 4 Drawing Sheets

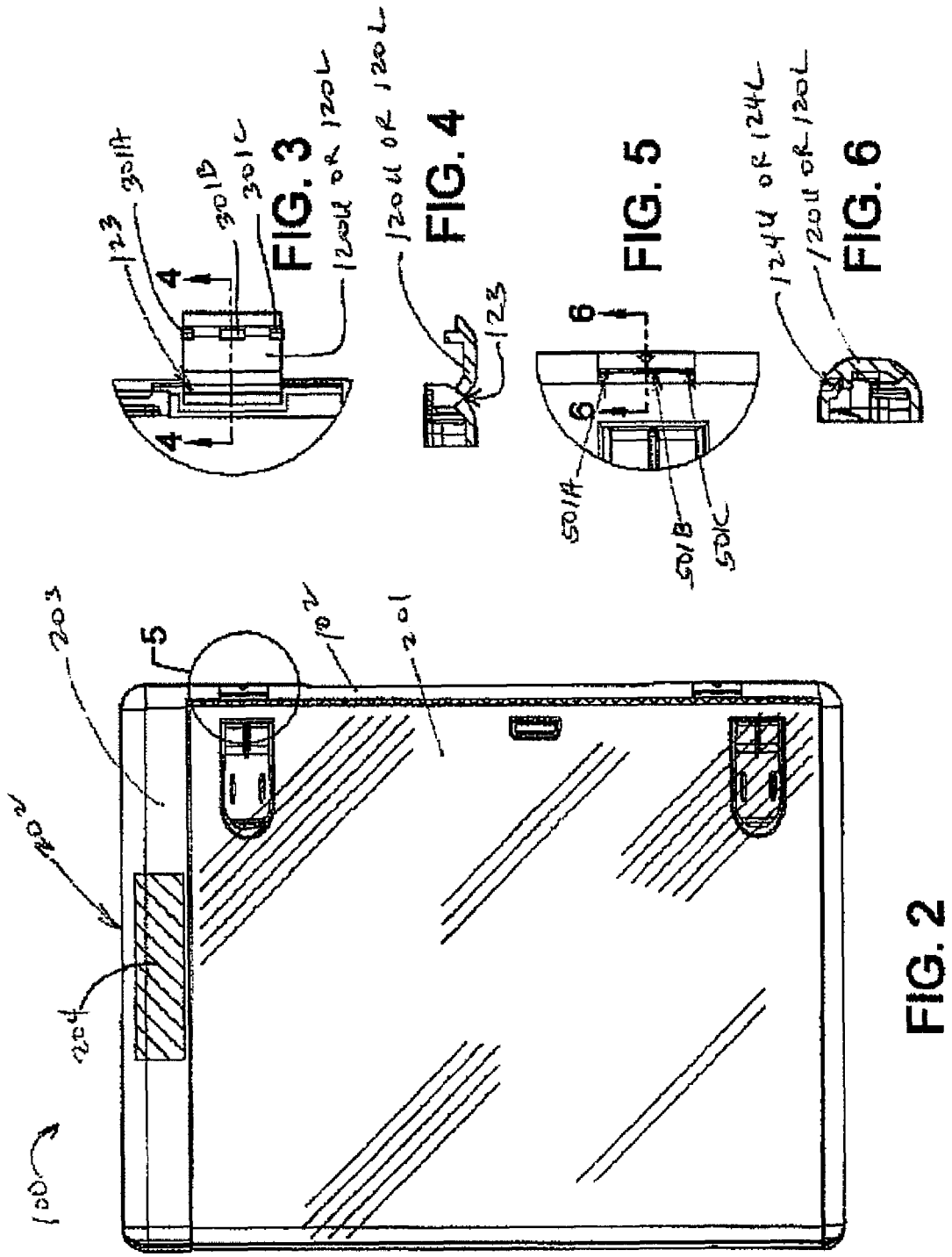

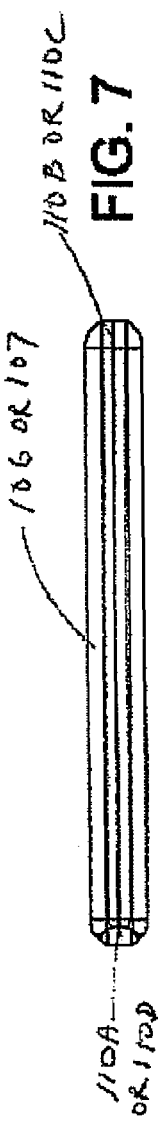
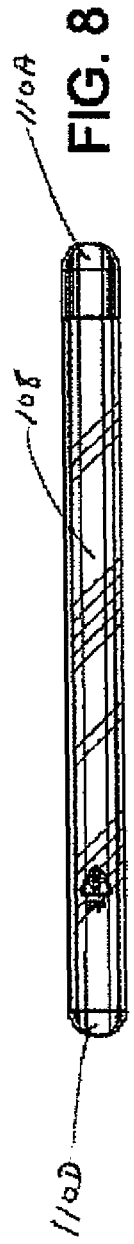
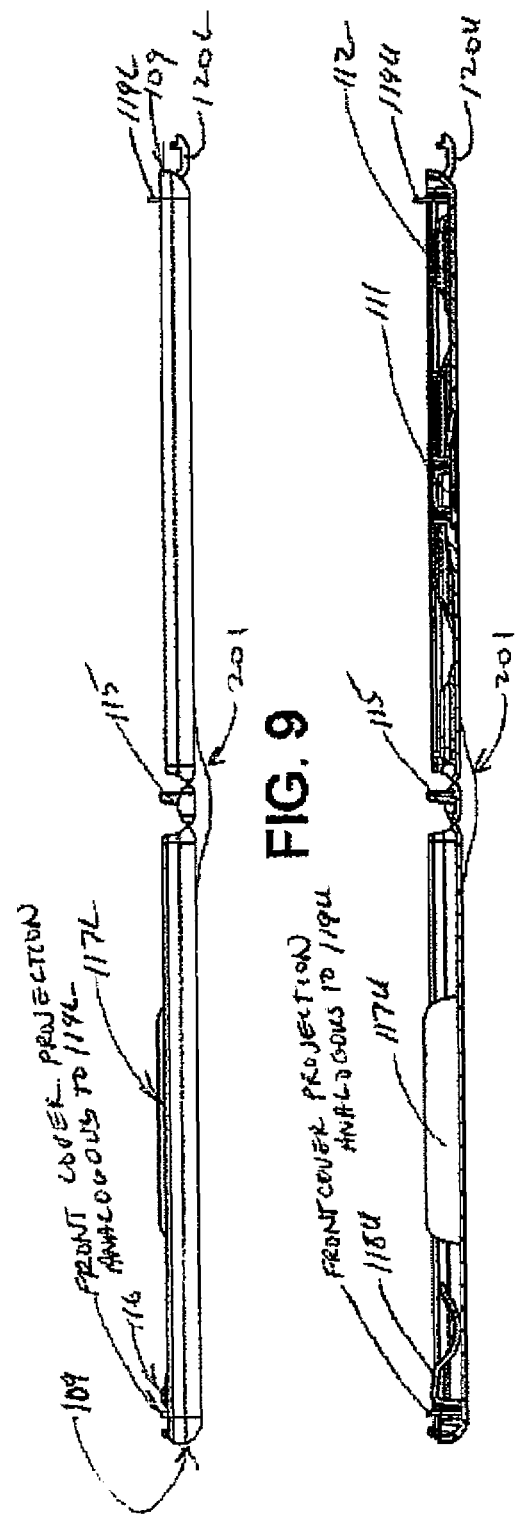

INJECTION MOLDED CASE FOR OPTICAL STORAGE DISCS

CROSS REFERENCE TO RELATED APPLICATIONS

This application is continuation-in-part of application Ser. No. 11/268,205, filed Nov. 7, 2005, which issued as U.S. Pat. No. 7,428,968, and this application further claims priority to U.S. Provisional Application Nos. 60/760,873, filed Jan. 20, 2006; 60/795,504, filed Apr. 27, 2006; and 60/797,107, filed May 2, 2006. The contents of the provisional and parent applications are hereby incorporated by reference.

FIELD OF THE INVENTION

This invention relates to cases for optical storage discs such as compact discs and digital video discs and, more particularly, to injection molded cases with a title band and off-center disk mounting hub.

BACKGROUND OF THE INVENTION

Cases for storing optical storage discs, such as compact discs (CDs) and video compact discs (VCDs) and digital video discs (DVDs), when not being used, have been manufactured for over two decades. The typical case is a square-cornered box having a center hub for receiving the central mounting aperture of the disk. There are significant differences between so-called "jewel cases" used to store CDs and the taller cases used to store DVDs. The first significant difference is that conventional jewel cases are typically injection molded from polystyrene plastic. As the use of this material precludes the use of a "live" hinge, the cases covers are formed in two pieces—a front cover and a back cover—that use snap-together hinges. A third piece, which is internal to the case, snaps into the back cover and holds the back information sheet in place. The second significant difference is that the mechanism used to hold CDs is generally a spring plastic assembly that requires that CDs be pried therefrom. DVD cases, on the other hand, are typically injection molded as a single piece from polyolefins, such as polyethylene and polypropylene, and rely on live hinges to interconnect a front cover, a spine and a back cover. In addition, as DVDs are considered to be more fragile than CDs, DVD case specifications require a disc retaining mechanism (usually called a hub) having a push-button release. Although some CD cases have been injection molded from polyolefins such as polyethylene and polypropylene and have used disc attachment mechanisms that do not require the CD to be pried therefrom, they constituted a tiny minority of CD cases in use.

U.S. Pat. No. D459,935 discloses a typical injection-molded DVD case. It has a spine connected to both a front cover and a back cover via live hinges. Live hinges are ultra-thin and, hence, ultra-flexible strips of polyolefin material formed between spine and covers during the injection molding process. The case of this patent, like nearly all of those produced by the DVD packaging industry, is a shallow, medially split rectangular box with filleted edges and corners. A serious problem associated with the designs of current DVD cases is that the video disc stored within the case can be stolen without fully opening the case. Although most DVD cases have a disposable AM or RF security label adhesively attached to the inside of the case, shoplifters have learned how to pop the disc from the hub by squeezing the case, pry the case open along a single edge, and then shake the disc out of the case. The shoplifter walks out of the store with the disc, leaving the case and the security label behind.

Recently, high-definition optical discs which are read by laser diodes operating in the blue range of the electromagnetic spectrum have been introduced. Such optical discs are capable of storing far more data because blue lasers have a shorter wavelength than previously used lasers and, hence, result in a larger data storage capacity on a disc of same size which may now contains a movie in greater resolution. Currently there are two main competing formats for such high-definition optical discs: "HD DVD" and "Blu-ray Disc." Marketing experts in the motion pictures distribution industry want to provide packaging that is uniquely identifies the "HD DVD" or the "Blu-ray Disc."

It has become common to package two optical discs in a single case, with the first optical disc containing the motion picture, and the second containing commentary, scenes deleted from the release version of the motion picture, interviews with the actors, special related features, and so forth. There are also other reasons for a case to store two or more discs, such as, saving space, offering convenience to retrieve movie titles belonging to the same series, etc.

What is needed is a new injection molded double-DVD case that has a new, more modern and aesthetically appealing appearance and provides a conveniently place for a title band, that can be used with existing equipment at optical disc replication and packaging companies, and that includes additional security features that hamper removal of a packaged optical disc from its case before it can be sold.

SUMMARY OF THE INVENTION

One object of the present invention is to provide a one-piece, injection molded optical disc case that has a more aesthetically appealing appearance with rounded rimwalls. Another object of the present invention is to provide a one-piece, injection molded optical case that offers a convenient place to accommodate a title band for displaying indicia of the disc format or other information pertaining to the disc it contains. Optionally, the optical disc case of the present invention includes security features that hamper removal of a packaged optical disc from its case before by shoplifters.

In one particular embodiment of the present invention, the optical disc case, when in a closed configuration, has generally semi-cylindrical rimwalls, comprising upper and lower rimwalls, a spine rimwall, and a closure rimwall, which intersect in generally quarter-spherical corners. The generally semi-cylindrical rimwalls can be flattened slightly to prevent multiple closed cases that are being pushed down an assembly line from climbing over one another. The first live hinge at a first quarter position along the spine rimwall, and the second live hinge at a third quarter position along the spine rimwall to permit the front cover, the back cover and the spine lying in a common plane when in an open configuration. In other words, the front cover incorporates about one-fourth of the spine rimwall, the spine incorporates about one-half of the spine rimwall, and the back cover incorporates the remaining about one-fourth of the spine rimwall. This configuration has an added advantage in that, when the case is open, it occupies less table space than does a case having the same thickness and a flat spine that is perpendicular to the front and back covers when the case is closed.

In another embodiment of the present invention, the optical disc case has an off-center disk mounting hub which is advantageous in two respects. First, the polypropylene sleeve (or PP sleeve) which surrounds and covers major portions of spine and front and rear covers and in which is inserted a printed paper title and credits page, has been set back from the upper edge of the case an amount sufficient to leave a band on which indicia such as "HD DVD" or "Blu-ray Disc" can be printed on the front cover. Second, for the off-center disk mounting hub and platform can conveniently provide space inside the case, either above or below the disk mounting platform for an Electronic Article Surveillance (EAS) tag, without encroaching on the title band at the top of the case.

The case may is fabricated from a colored transparent pofyolefin material such as polypropylene or polyethylene. For most applications, polypropylene is considered the preferred material, as live hinges made of polypropylene can be flexed a much greater number of times than can be live hinges made of polyethylene.

In another embodiment, the optical disc case optionally stores a pair of optical discs in a parallel, axially-aligned relationship. One of the problems associated with the storage of two discs on axially aligned hubs is that if the case is compressed in the hub region, the hub release mechanism on each hub will be activated and each hub will release the optical disc that is installed thereon. This problem can be solved by reducing the number of hub release fingers from six to three and then rotating one of the hubs so that the hub fingers of one hub are offset from the hub fingers of the other hub. In addition, the release button on each hub has been recessed so that they cannot push against one another even when the case is compressed. A printed insert may also be stored in the case between the two optical discs, insert support rails are provided on the inside of the front cover. The support rails and the disk mounting hub located on the inner surface of the front cover cooperate to elevate the printed insert above the upper surface of the optical disc that is stored on the hub that is integrated into the front cover. Because the disk mounting hub and platform structure on each cover is offset from the cover centers, the lower support rail is partially incorporated in the front cover disk mounting platform.

In another embodiment, the optical disc case also incorporates anti-theft features. The spine incorporates a tab that rotates down over the outer edge of the stored disc when the cover is in a closed state. Likewise, the front cover has a bracket of L-shaped cross section that locks over the opposite outer edge of the stored disc when the front cover is closed. Inner guide walls on the inside front cover have two functions: firstly, to guide the placement of the booklet that will be installed within the case so that it does not encroach on the band at the top of the case and, secondly, to make it more difficult to shake a disc out of the top or bottom ends of the case that have been partially opened by bowing the front and back covers of the case. The guide walls make it necessary to bow the case considerably more than would be necessary for a case without such guide walls.

In another embodiment, the optical disc case incorporates a pair of projections which extend vertically from the rear cover vertical near the closure edge, further making it difficult to slide a disc out of the closure side of the case when it is opened just a crack. As an additional security feature, the case can be equipped with at least one, preferably two, security latches that lock the front and back covers together along their closure edges, and can be taped over to slow down shoplifters, thereby making it more difficult to open the case, especially when wrapped in a heat-sealed sheet of transparent display wrap. The latches do not detract from the aesthetic quality of the case, as they conform to the shape of the case when closed and locked.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

BRIEF DESCRIPTION OF DRAWINGS

FIG. 2 is a plan view of the closed and latched injection molded optical disc case, showing primarily the outer surface of the front cover;

FIG. 3 is a close-up view of the open hinge within circle 3 of FIG. 1;

FIG. 4 is a cross-sectional view of the open hinge of FIG. 3, taken through section line 4-4 of FIG. 3;

FIG. 5 is a close-up view of the closed hinge within circle 5 of FIG. 2;

FIG. 6 is a cross-sectional view of the closed hinge of FIG. 5, taken through section line 6-6 of FIG. 5;

FIG. 7 is a plan view of the top or bottom of the injection molded optical disc case in a fully closed and latched configuration;

FIG. 8 is an elevational view of the spine of the injection molded optical disc case in a fully closed and latched configuration;

FIG. 9 is an elevational view of the fully open injection molded optical disc case, as seen from the bottom edge thereof;

FIG. 10 is a cross-sectional view of the fully open injection molded optical disc case, taken through section line 10-10 of FIG. 1.

DETAILED DESCRIPTION OF THE PREFERRED EMBODIMENTS

Figure 1:
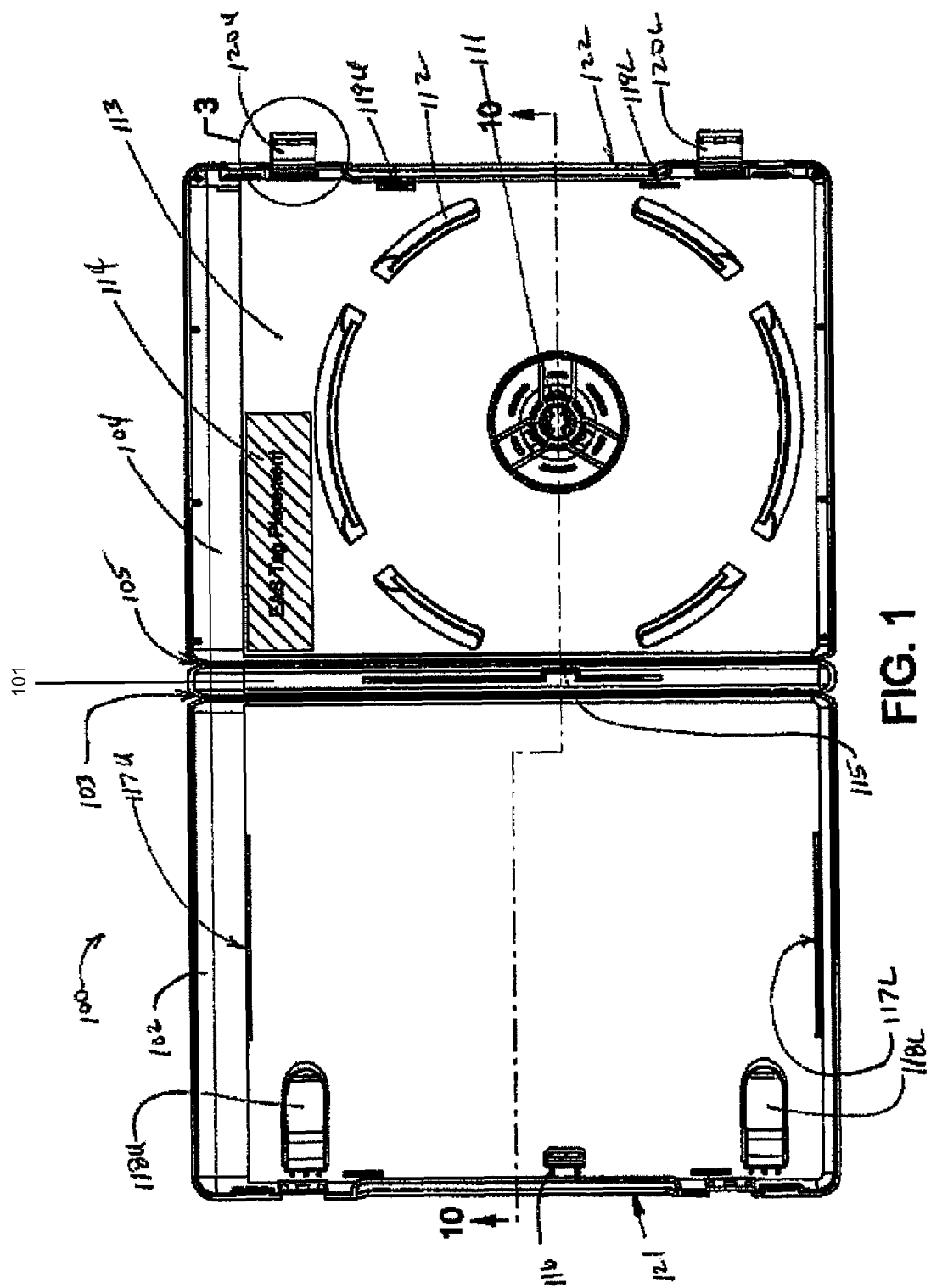
FIG. 1 is a plan view of the inner major surfaces of the injection molded optical disc case in a full open configuration.
Figure 11:
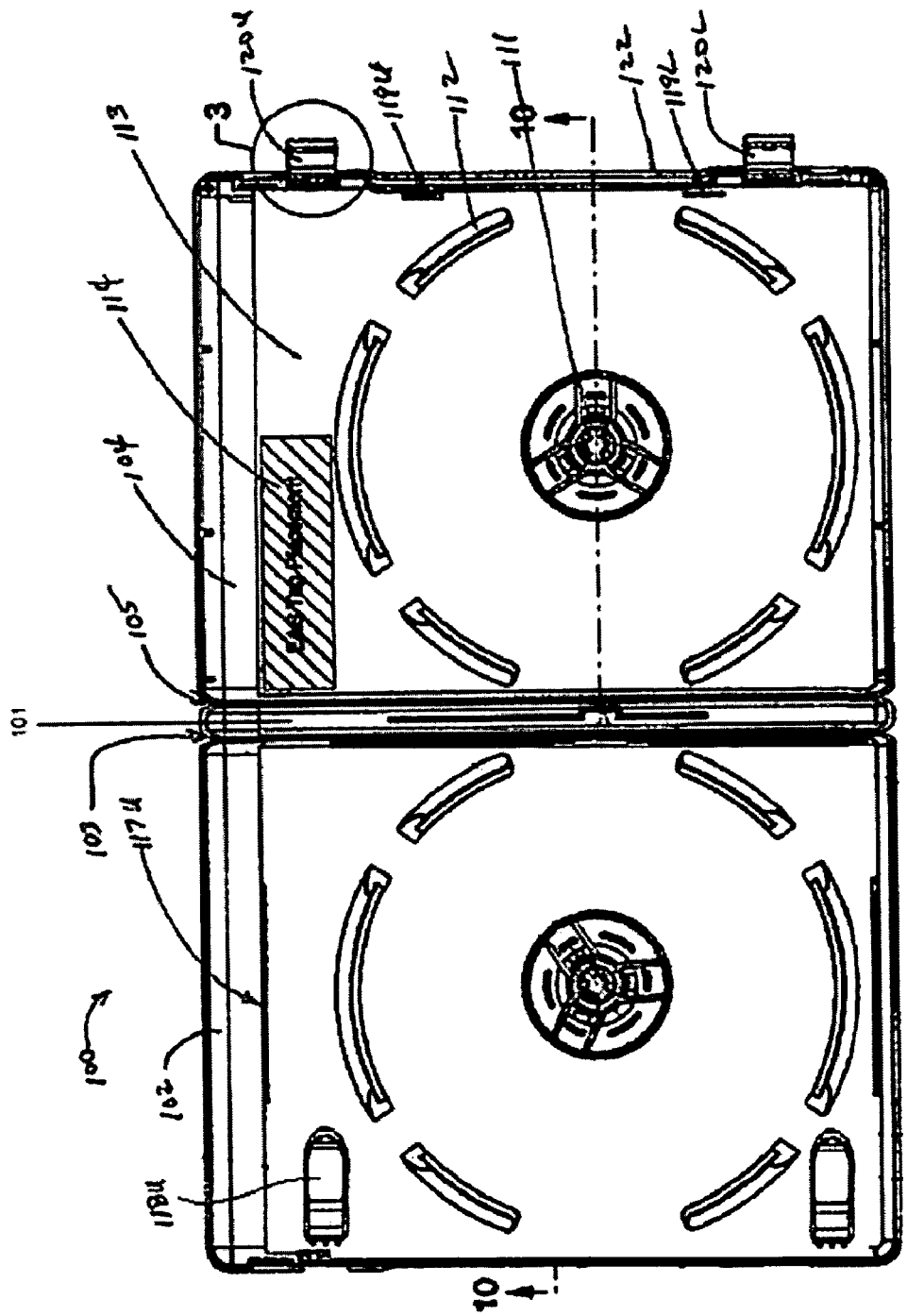
FIG. 11 is a plan view of the inner major surfaces of an injection molded optical disc case including two disc mounting structures in a full open configuration.

Referring now to a particular embodiment shown in FIG. 1, a new injection-molded optical disc case 100 has a more modern, aesthetically appealing appearance, and can be used with existing packaging equipment at optical disc packaging facilities. As with conventional DVD cases, the new optical disc case 100 includes a spine 101, a front cover 102 coupled to the spine 101 via a first live hinge 103, and a back cover 104 coupled to the spine 101 via a second live hinge 105. The new DVD 100 case differs from conventional optical disc cases in that, when in a closed configuration, it forms generally semi cylindrical rimwalls, including an upper rimwall 106, a lower rimwall 107, a spine rimwall 108 (FIG. 8), and a closure rimwall 109 (FIG. 9), which intersect in generally quarter-spherical corners 110A, 110B, 110C and 110D (FIG. 7 and FIG. 8), which may comprise some small flattened areas. FIGS. 7-10 also show an optional feature: a flattened band is running along a center portion of said semi-cylindrical rimwalls 106, 107, 108 and 109 to prevent multiple closed cases that are being pushed down an assembly line from climbing over one another. For the front cover 102, the back cover 104 and the spine 101 to lie in a common plane when in an open configuration, it was found suitable to position the first live hinge 103 at approximately a first quarter position along the spine rimwall 108, and the second live hinge 105 at approximately a third quarter position along the spine rimwall 108. In other words, the front cover 102 incorporates about one-fourth of the spine rimwall 108, the spine 101 incorporates about one-half of the spine rimwall 108, and the back 104 cover incorporates the remaining about one fourth of the spine rimwall 108. This configuration has an added advantage in that, when the case is open, it occupies slightly less table space than does a case having the same thickness and a flat spine that is perpendicular to the front and back covers when the case is closed. Also shown in FIG. 1, the new optical disc case 100 has an off center disk mounting hub 111 and platform 112 for two reasons. The PP sleeve 201, shown in FIG. 2, which surrounds and covers major portions of the spine 101, the front cover 102, and the rear cover 104, and in which is inserted a printed paper title and credits page (not shown), has been set back from the upper edge 202 of the case 100 an amount sufficient to leave a transparent title band 203 on which the title "HD DVD," "Blu-ray Disc" or other logo can be printed in an outside rectangular area 204 on the front cover 102. Of course, in practice, the logo may be printed or shown in any place within the title band 203 as desired. The case of the present invention may be fabricated from a colored transparent polyolefin material such as polypropylene or polyethylene. For most applications, polypropylene is considered the preferred material, as live hinges made of polypropylene can be flexed a much greater number of times than can be live hinges made of polyethylene. With the disk mounting hub 111 being positioned off-center comes with another advantage: it provides space 113 on the inner surface of the back cover above (as shown in FIG. 1) the disk mounting platform 112 for the mounting of an Electronic Article Surveillance (EAS) tag, without encroaching on the transparent title band 203 at the top of the case 100. In this case, the EAS tag is shown mounted in the inside rectangular area 114.

Not only is the new optical disc 100 case unique in having the title band and more aesthetically pleasing than prior art designs, it also features enhanced structural rigidity and requires slightly less polyolefin material for its manufacture.

This particular optical disc case also incorporates significant anti-theft features. The spine 101 incorporates a tab 115 that rotates down over the outer edge of the stored optical disc when the cover 102 is in a closed configuration (FIG. 1). Likewise, the front cover has a bracket 116 of L-shaped cross section that locks over the opposite outer edge of the stored optical disc when the front cover 102 is closed. Inner upper and lower guide walls 117U and 117L, respectively, on the inside front cover 102 have two functions: firstly, to guide the placement of the booklet (not shown) that will be installed within the case beneath clips 118U and 118L so that it does not encroach on the transparent title band 203 at the top of the case 100 and, secondly, to make it more difficult to shake a optical disc, even if it has been released from the disk mounting hub 111, out of the top or bottom ends of the case that have been partially opened by bowing the front and back covers 102 and 104, respectively, of the case 100. The guide walls 117U and 117L make it necessary to bow the case considerably more than would be with a case without such guide walls. The case 100 also incorporates a pair of projections 119U and 119L, which extend vertically from the rear cover vertical near the closure edge. These projections 119U and 119L make it difficult to slide a optical disc out of the closure side of the case when it is opened just a crack. As an additional security feature, the case can be equipped with at least one, preferably two, security latches 120U and 120L that lock the front cover 102 and back cover 104 together along their closure edges 121 and 122, respectively, and can be taped over to slow down shoplifters, thereby making it more difficult to open the case, especially when wrapped in a heat-sealed sheet of transparent display wrap. The security latches 120U and 120L do not detract from the aesthetic quality of the case, as they conform to the shape of the case 100 when closed and locked.

Referring now to FIGS. 3 and 4, they are close-up views of open upper security latch 120U and shows how it is connected to the back cover 104 via a third live hinge 123. The lower security latch 120L is identical to the upper latch 120U.

Referring now to FIGS. 3, 5 and 6, it will be noted that each security latch 120U or 120L has three extensions 301A, 301B and 301C that mate with three apertures 501A, 501B and 501C, respectively, that are formed within an associated latch socket 124U or 124L in the front cover 102. FIG. 7 is a plan view of the top (or bottom) of the injection molded optical disc case in a fully closed and latched configuration. FIG. 8 is an elevational view of the spine of the injection molded optical disc case in a fully closed and latched configuration. FIG. 9 is an elevational view of the fully open injection molded optical disc case, as seen from the bottom edge thereof. FIG. 10 is a cross-sectional view of the fully open injection molded optical disc case, taken through section line 10-10 of FIG. 1.

As used in the description and the claims, the article "a" means one or more, unless it is defined otherwise.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A case for storing an optical storage disc, being made by injection-molding as one-piece and comprising:
    a spine;
    a front cover having a front upper edge, a front lower edge, a front closure edge and a front spine edge, said front cover being coupled to said spine via a first live hinge along at least a portion of said front spine edge;
    a back cover having a back upper edge, a back lower edge, a back closure edge and a back spine edge, said back cover being coupled to said spine via a second live hinge along at least a portion of said back spine edge;
    a disc mounting structure positioned on an inner surface of said back cover, the disc mounting structure being positioned closer to said back lower edge than to said back upper edge; and
    a sleeve attached to opposite ends of the front cover and the back cover adjacent the respective closure edges and configured to retain a title and credits page between the sleeve and the spine, and front and back covers of the case when the case is in a closed configuration;
    wherein the sleeve surrounds and covers major portions of the spine, the front cover and the back cover;
    wherein the sleeve is set back from the front and back upper edges of the front and back covers such that the setback defines a title band on an upper portion of the case for showing a symbol or text;
    wherein the portion of the front cover that is covered by the sleeve includes clips configured to retain a booklet within the interior of the case when the case is in a closed configuration;
    wherein the front cover further includes upper and lower guide walls that extend into the interior of the case when the case is in a closed configuration and that are configured to guide placement of a booklet into the clips so that the booklet does not encroach into the title band;

wherein the positioning of the disk mounting structure on the inner surface of the back cover closer to said back lower edge than to said back upper edge provides a mounting space on the inner surface of the back cover for mounting an EAS tag, where the mounting space is located above the disk mounting structure and a distance below the back upper edge of the back cover that is greater than the setback of the sleeve from the back upper edge of the back cover; and wherein the mounting space is located such that an EAS tag mounted in the space does not encroach into the title band.

2. The case according to claim 1, wherein the set back of the sleeve from said upper edges of said front cover and back cover is within a range of between 0.8 to 2.5 centimeters.

3. The case according to claim 2, wherein said sleeve is transparent.

4. The case according to claim 1, wherein said first live hinge is positioned at about a first quarter of a spine rimwall, second live hinge is positioned at about a third quarter of said spine rimwall, said front cover incorporates about one-fourth of said spine rimwall, said back cover incorporates about one-fourth of said spine rimwall, and said spine accounts about one-half of said spine rimwall.

5. The case according to claim 1, further comprising:
a projection which extends outwardly from an inner surface of said front cover adjacent said front closure edge;
said projection hampering removal of a stored disc through a slit formed between said front and back closure edges when the case is in a partially open state.

6. The case according to claim 1, further comprising a tab integral with said spine that rotates down over an outer edge of an optical storage disc stored on the disc mounting structure when the case is in a closed configuration.

7. The case according to claim 1, further comprising at least one security latch to lock said front cover to said back cover at a location proximal to said front and back closure edges.

8. The case of claim 1, wherein said spine has upper and lower end portions which fit into corresponding cutouts in said front and back covers, respectively.

9. The case of claim 1, wherein the title band is transparent.

10. The case of claim 1, wherein the upper and lower guide walls create a barrier hampering the removal of a stored disc through a slit formed between the front and back upper edges or the front and back lower edges due to the bowing of the front and back covers of the case.

11. The case of claim 1, wherein:
in a closed configuration the case has an upper rimwall, a spine rimwall, a lower rimwall and a closure rimwall; and
at least three of said rimwalls are generally semi-cylindrical.

12. The case of claim 11, wherein each of the rimwalls includes a portion of the rimwall that is generally semi-cylindrical.

13. The case of claim 12, wherein the generally semi-cylindrical portions of the rimwalls include a rounded portion and a flattened portion.

14. The case of claim 13, wherein the rounded portion is equal to or larger than the flattened portion.

15. A case for storing an optical storage disc, being made by injection-molding as one-piece and comprising:
a spine;
a front cover having a front upper edge, a front lower edge, a front closure edge and a front spine edge, said front cover being coupled to said spine via a first live hinge along at least a portion of said front spine edge;
a back cover having a back upper edge, a back lower edge, a back closure edge and a back spine edge, said back cover being coupled to said spine via a second live hinge along at least a portion of said back spine edge; and
a disc mounting structure positioned on an inner surface of said back cover, the disc mounting structure being positioned closer to said back lower edge than to said back upper edge;
a disc mounting structure positioned on an inner surface of said front cover, the disc mounting structure being positioned closer to said front lower edge than to said front upper edge;
a sleeve attached to opposite ends of the front cover and the back cover adjacent the respective closure edges and configured to retain a title and credits page between the sleeve and the spine, and front and back covers of the case when the case is in a closed configuration;
wherein the sleeve surrounds and covers major portions of the spine, the front cover and the back cover;
wherein the sleeve is set back from the front and back upper edges of the front and back covers such that the setback defines a title band on an upper portion of the case for showing a symbol or text;
wherein the positioning of the disk mounting structure on the inner surface of the back cover closer to said back lower edge than to said back upper edge provides a mounting space on the inner surface of the back cover for mounting an EAS tag, where the mounting space is located above the disk mounting structure and a distance below the back upper edge of the back cover that is greater than the setback of the sleeve from the back upper edge of the back cover;
wherein the mounting space is located such that an EAS tag mounted in the space does not encroach into the title band;
wherein the portion of the front cover that is covered by the sleeve includes clips configured to retain a booklet within the interior of the case when the case is in a closed configuration; and
wherein the front cover further includes upper and lower guide walls that extend into the interior of the case when the case is in a closed configuration and that are configured to guide placement of a booklet into the clips so that the booklet does not encroach into the title band.

* * * * *